United States Patent [19]
Rosek

[11] Patent Number: 5,412,900
[45] Date of Patent: * May 9, 1995

[54] SPINNER DEVICE FOR VERTICAL RETRIEVE FISHING LURE

[76] Inventor: William A. Rosek, Rte. 4, Box 244, Waverly, Va. 23890

[*] Notice: The portion of the term of this patent subsequent to Apr. 13, 2010 has been disclaimed.

[21] Appl. No.: 153,033
[22] Filed: Nov. 17, 1993
[51] Int. Cl.⁶ .............................................. A01K 85/00
[52] U.S. Cl. ................... 43/42.19; 43/42.14; 43/42.2
[58] Field of Search .................. 43/42.19, 42.2, 42.14, 43/42.17

[56] References Cited

U.S. PATENT DOCUMENTS

| | | | |
|---|---|---|---|
| 800,536 | 9/1905 | Bailey | 43/42.14 |
| 1,573,288 | 2/1926 | Wilson | 43/42.2 |
| 1,836,650 | 12/1931 | Davenport | 43/42.19 |
| 2,926,451 | 3/1960 | Lela | 43/42.14 |
| 4,110,930 | 9/1978 | Daniels | 43/42.14 |
| 4,447,980 | 5/1984 | Bassett | 43/42.2 |
| 5,113,606 | 5/1992 | Rinker | 43/42.19 |

FOREIGN PATENT DOCUMENTS

| | | | |
|---|---|---|---|
| 648475 | 12/1928 | France | 43/42.19 |
| 1088806 | 9/1954 | France | 43/42.19 |

*Primary Examiner*—Kurt Rowan
*Attorney, Agent, or Firm*—Norman B. Rainer

[57] ABSTRACT

A spinner device is provided for incorporation into a fishing lure whereby the lure is caused to assume a vertical attitude upon falling through water. The spinner has a centered bearing hub and a number of identical blades radially emergent from the hub and terminating in distal extremities. Each blade has a forwardly directed lift angle of between 10 and 25 degrees and a pitch angle of between 10 and 20 degrees. The bearing hub contains a circular cylindrical bore having a length at least 4 times its diameter. The bore is adapted to slidably engage a stiff wire component of a fishing lure. The diameter of the bore is greater than the diameter of the wire by 0.004 to 0.020 inch.

3 Claims, 1 Drawing Sheet

SPINNER DEVICE FOR VERTICAL RETRIEVE FISHING LURE

BACKGROUND OF THE INVENTION

1. Field of the Invention

The present invention concerns fishing lures, and more particularly relates to a lure having a spinner device intended for incorporation into a fishing lure to cause the lure to assume a vertical attitude upon falling through water.

2. Description of the Prior Art

U.S. Pat. Nos. 5,076,005 and 5,201,859 describe fishing lures equipped with spinners that rotate not only when the lure is pulled horizontally through the water, but also rotate in vertical modes of lure movement.

Examples of situations when vertical plane rotations of the spinner blade would be desirable include, but are not limited to, ice fishing, jigging over brush piles and along drop-offs and ledges, as well as during the count-down method of fishing; wherein, the cast lure is allowed to sink for a predetermined period of time to reach a certain depth before the lure is retrieved in the normal manner along a generally horizontal plane.

The spinner component of the aforesaid U.S. Pat. No. 5,201,859 is comprised of a number of flat blades radially emergent from a central axle element and disposed in a coplanar array about said axle element. The spinner component of the aforesaid U.S. Pat. No. 5,076,005 discloses a spinner element having a number of blades radially emergent from a central bearing element, said blades being angled upwardly or forwardly toward the fishing line to which the lure attaches. Although the spinner components of said Patents perform well in most circumstances, better rotation of the spinner is desirable, particularly when the line moves at low velocity in any particular direction.

It is accordingly an object of the present invention to provide an improved spinner component for a vertical retrieve fishing lure.

It is another object of this invention to provide a spinner which will cause a lure to seek and maintain a stable upright disposition when it falls through the water under the influence of gravity alone.

It is a further object of the present invention to provide a fishing lure equipped with a spinner of the aforesaid nature.

It is yet another object of this invention to provide a spinner of the aforesaid nature of durable construction and amenable to low cost manufacture.

These and other beneficial objects and advantages are accomplished in accordance with the present invention by a spinner device for a fishing lure, said device comprising:

a) a hub containing centered elongated bearing means extending between forward and rearward extremities which have aligned circular apertures, the distance between said extremities being at least four times the diameter of said apertures, and b) a number of identical blades emergent radially from said bearing means and terminating in a distal extremity, said blades being equidistantly spaced in a circular array, each blade having the same forwardly directed lift angle between 10 and 25 degrees, and the same pitch of between 10 and 20 degrees.

In a preferred embodiment, the blades are concavely curved in the forwardly facing direction. In another preferred embodiment, the distal extremities of the blades are rounded.

The fishing lure of the present invention is comprised of a length of stiff wire whose forward or upper extremity has an eyelet formed therein, and whose rear or lower extremity has retaining means such as a looped snap member. A spinner of the present invention is disposed upon the wire in a manner such that the blades are angled toward the upper extremity of the wire, and the diameter of the apertures of the bearing means is greater than the diameter of the wire by an amount in the range of 0.004–0.020 inch. A weight and attractor means are disposed upon said wire behind said spinner.

BRIEF DESCRIPTION OF THE DRAWING

For a fuller understanding of the nature and objects of the invention, reference should be had to the following detailed description taken in connection with the accompanying drawing forming a part of this specification and in which similar numerals of reference indicate corresponding parts in all the figures of the drawing.

DESCRIPTION OF THE PREFERRED EMBODIMENT

Figure 1:
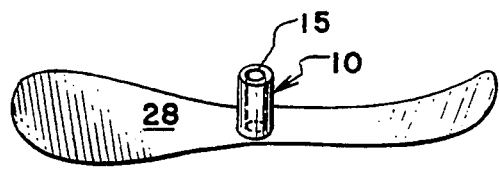
FIG. 1 is an enlarged top perspective view of an embodiment of the spinner device of this invention having two curved blades.

Referring to FIGS. 1–5, embodiments of the spinner device 22 of this invention are shown comprised of bearing means in the form of hub 10, and blades 11. The hub is defined by external sidewall 12 and upper and lower extremities 13 and 14, respectively. A circular cylindrical bearing bore 15 extends between said extremities. The length of bore 15 is at least four times its diameter. Such criticality in the dimensional configuration of the bore has been found necessary to achieve rotational stability when the spinner is emplaced upon the wire component of a fishing lure.

The blades are radially emergent from sidewall 12, having proximal extremities 16, terminal distal extremities 17, and upper and lower surfaces 28 and 29, respectively. The number of blades that may be employed can range from 2 to 8. In each embodiment, all the blades are of identical size and shape. The blades are equidistantly spaced about the hub in a circular array. Each blade has a forwardly directed lift angle, denoted as angle A in FIG. 2, having a magnitude between 10 and 25 degrees. Said lift angle is defined by the intersection of a reference line orthogonal to bore 15, and an axis line going through both proximal and distal extremities of a blade in the same vertical plane as said reference line.

Figure 3A:
FIG. 3A is a side view of an alternative embodiment, having four flat blades.
Figure 3B:
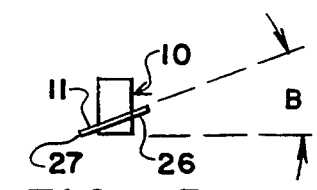
FIG. 3B is a fragmentary sectional side view of FIG. 3A.

Each blade is further positioned in a manner so as to have a pitch, denoted as angle B in FIG. 3B, between 10 and 20 degrees. The pitch angle may be further defined as the amount of rotational displacement of each blade about its axis, and causing each blade to have a leading edge 26 and trailing edge 27 having different elevations relative to the length of the wire.

The Figures show the blades emergent from the hub at the lowermost extremity of the hub. In other embodiments; however, the blades may attach to the hub at any elevation thereupon. It is important to note that the hub and blades are in fixed association. This may be achieved by attaching the blades to the hub or by causing the hub and blades to be fabricated as a single integral monolithic unit.

Figure 2:
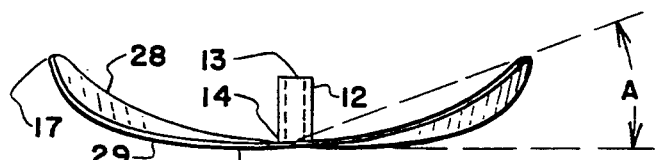
FIG. 2 is a side view of the spinner of FIG. 1.

In the preferred embodiment exemplified in FIGS. 1 and 2. The blades are concavely curved in the upward direction. Such curvature has been found to impart even greater positional stability to a lure, especially when the lure is allowed to fall through the water.

Figure 4:
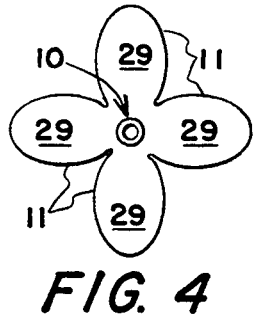
FIG. 4 is a bottom view of a second alternative embodiment, having four rounded blades.

In a further preferred embodiment, as shown in FIG. 4, the distal extremities of the blades are rounded.

Figure 5:
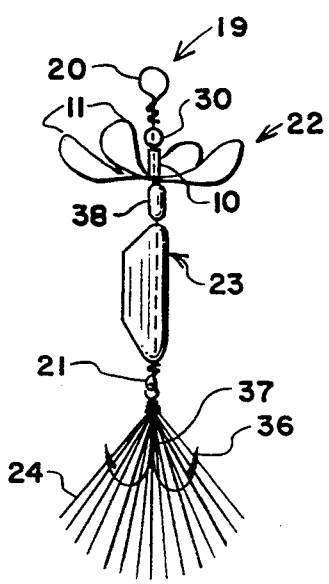
FIG. 5 is a side view of an embodiment of the fishing lure of this invention.

A lure of the present invention, as exemplified in FIG. 5, is comprised of a length of stiff wire 19 having eyelet 20 formed at its upper extremity. The lower extremity of wire 19 is equipped with retaining means in the form of a looped snap 21. A spinner device 22 of the present invention is disposed upon the wire in a manner such that the blades are angled toward eyelet 20. The diameter of bearing bore 15 is greater than the diameter of the wire by an amount in the range of 0.004–0.020 inch. Such tolerance between the wire and the bearing bore has been found to permit wobble-free yet unrestricted rotation of the spinner upon the wire. A first bearing bead 30 is disposed upon the wire between eyelet 20 and the upper extremity 13 of said hub. A weight unit 23 is positioned upon wire 19 below spinner 22. The weight member may have various streamlined shapes. A particularly preferred shape is a flattened or keel-shaped configuration, which is held fast to the wire by crimping, glue, solder, or other means. Such configuration and manner of attachment has been found to prevent twisting of the fishing line to which the lure is attached. A second bearing bead 38 is disposed upon the wire between said spinner and said weight unit. Said bearing bead is preferably of oblong shape, thereby increasing the distance between the spinner and weight unit. Such increased distance increases the leverage effect of the weight unit, whereby the overall effectiveness of the lure is enhanced. A multi-pointed barbed fish hook 36 is held by looped snap 21. Attractor means in the form of a skirt of feathers 24 is attached to the upper portion of the shank 37 of said fish hook.

In a lure of such construction, the spinner will rotate freely whether the lure is pulled horizontally or vertically, or allowed to fall vertically. In addition, the motion of the spinner stabilizes the position of the lure. For example, when allowed to fall, the lure maintains a vertical orientation with the eyelet upward and attractor means downward. Such function has not been achievable with prior art fishing lures.

Figure 6:
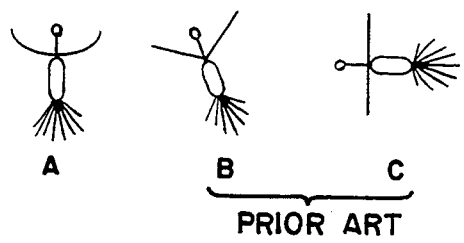
FIG. 6 is a side view exemplifying the performance of the lure of this invention, designated as A, with lures of the prior art designated B and C.

FIGS. 6A, 6B and 6C show the behavior of lures immediately upon free fall through the water. All three figures concern similarly constructed lures having feathered attractor means. FIG. 6A represents a lure having a spinner of the present invention having forwardly directed pitched and curved blades. FIG. 6B illustrates a lure whose spinner blades are flat and merely forwardly directed. FIG. 6C illustrates a lure whose spinner blades are flat and coplanar.

As FIG. 6A shows, the lure equipped with the spinner of the present invention quickly assumes a vertical descent position. FIG. 6B indicates that the lure, while falling, has not yet achieved a vertical position. FIG. 6C indicates that the lure, while falling, maintains a nearly horizontal position. In such horizontal position, the spinner does not rotate, and the overall appearance is not sufficiently life-like to induce a fish to strike at the lure.

Figure 7:
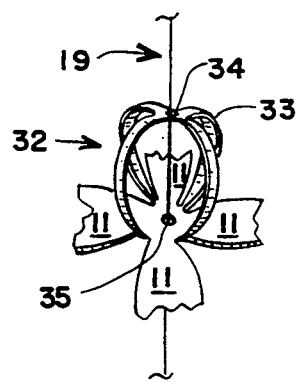
FIG. 7 is a fragmentary perspective view of a third alternative embodiment of the spinner device of this invention.

In the spinner shown in FIG. 7, hub 10 is replaced by bearing means 32 fashioned from four ribbon strips 33 which are continuous integral extensions of blades 11 and are derived by way of a cutting operation which forms said blades from a sheet of metal stock. Identical upper and lower ring apertures 34 and 35, respectively, are spaced apart, by a distance at least four times the diameter of said rings. The diameter of the rings is greater than the diameter of wire 19 by an amount in the range of 0.004 to 0.020 inch.

While particular examples of the present invention have been shown and described, it is apparent that changes and modifications may be made therein without departing from the invention in its broadest aspects. The aim of the appended claims, therefore, is to cover all such changes and modifications as fall within the true spirit and scope of the invention.

Having thus described my invention, what is claimed is:

1. A fishing lure comprising:
   a) a length of stiff wire of round cross-section having a forward extremity equipped with an eyelet and a rear extremity bent to form a looped snap member,
   b) a spinner comprising a hub containing elongated bearing means in the form of a circular bore centered within said hub and extending between forward and rearward extremities, the distance between said extremities being at least four times the diameter of said bore, and a number of identical blades emergent radially from said rearward extremity and terminating in rounded distal extremities, said blades being equidistantly spaced about said hub in a circular array, each blade being concavely curved in the forwardly facing direction and having the same forwardly directed lift angle of between 10 and 25 degrees, and the same pitch angle of between 10 and 20 degrees,
   c) said spinner mounted by virtue of said hub upon said wire in a manner causing said blades to be angled toward said eyelet, the diameter of the bore of said hub being greater than the diameter of said wire by an amount in the range of 0.004 to 0.020 inch,
   d) a weight unit disposed upon said wire behind said spinner,
   e) a first bearing bead disposed upon said wire between said eyelet and said spinner,
   f) a second beating bead disposed upon said wire between said spinner and said weight unit,
   g) a fish hook engaged by said looped snap member, and
   h) attractor means disposed upon said fish hook.

2. The fishing lure of claim 1 wherein said weight unit has a keel shape and is held fast upon said wire.

3. A spinner device for a vertical retrieve fishing lure comprised of a stiff wire having a forward end equipped with an eyelet and a rear end that engages a fish hook, said device comprising:
  a) a hub containing elongated bearing means in the form of a circular bore centered within said hub and extending between forward and rearward extremities, the distance between said extremities being at least four times the diameter of said bore, and
  b) a number of identical blades emergent radially from said rearward extremity in a plane perpendicular to said bore and terminating in rounded distal extremities, said blades being equidistantly spaced about said hub in a circular array, each blade being concavely curved in a direction facing the forward extremity of said bore and having the same lift angle of between 10 and 25 degrees directed toward the forward extremity of said bore and the same pitch angle of between 10 and 20 degrees, whereby
  c) said spinner device, when rotatively associated with said lure in a manner wherein said blades are directed toward said eyelet, causes said lure to assume a substantially vertical position when allowed to fall through water.

* * * * *